United States Patent
Xu

(10) Patent No.: US 9,367,163 B2
(45) Date of Patent: Jun. 14, 2016

(54) IN-CELL TOUCH ARRAY SUBSTRATE

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 55 days.

(21) Appl. No.: 14/240,474

(22) PCT Filed: Jan. 8, 2014

(86) PCT No.: PCT/CN2014/070327
§ 371 (c)(1),
(2) Date: Feb. 24, 2014

(87) PCT Pub. No.: WO2015/096209
PCT Pub. Date: Jul. 2, 2015

(65) Prior Publication Data
US 2015/0185929 A1    Jul. 2, 2015

(30) Foreign Application Priority Data

Dec. 26, 2013  (CN) .......................... 2013 1 0730277

(51) Int. Cl.
G06F 3/041 (2006.01)
G02F 1/1333 (2006.01)
G02F 1/1362 (2006.01)

(52) U.S. Cl.
CPC .......... *G06F 3/0412* (2013.01); *G02F 1/13338* (2013.01); *G02F 1/136286* (2013.01)

(58) Field of Classification Search
None
See application file for complete search history.

(56) References Cited

U.S. PATENT DOCUMENTS

| 6,583,777 | B2 * | 6/2003 | Hebiguchi | G09G 3/3648 345/87 |
| 8,502,948 | B2 * | 8/2013 | Su | G02F 1/136286 349/139 |
| 9,274,636 | B2 * | 3/2016 | Xu | G02F 1/13338 |
| 2001/0015715 | A1 * | 8/2001 | Hebiguchi | G09G 3/3648 345/92 |
| 2009/0262054 | A1 * | 10/2009 | Hsu | G09G 3/3648 345/87 |
| 2010/0188378 | A1 * | 7/2010 | Chiang | G09G 3/3648 345/206 |

(Continued)

*Primary Examiner* — Dismery Mercedes
(74) *Attorney, Agent, or Firm* — Andrew C. Cheng

(57) ABSTRACT

The present invention provides an in-cell touch array substrate, and which includes alternatively arranged data lines and horizontal gate scanning lines; pixel switches electrically interconnected to the adjacent horizontal gate scanning lines and data lines pixel electrodes electrically interconnected to the pixel switches; and vertical gate scanning lines arranged alternatively between every two adjacent data lines, and being perpendicular to the horizontal gate scanning lines, wherein at lease one via is defined in an intersection between the vertical gate scanning line and the horizontal gate scanning line such that the vertical gate scanning line and the horizontal gate scanning lines are electrically interconnected with each other through the via. With at least one via is defined at the intersections of the vertical gate scanning lines and the horizontal gate scanning lines so as to create an electrical interconnection between the vertical gate scanning line and the horizontal gate scanning line. By this arrangement, both the gate scanning lines and the data lines have the same driving direction. Under the limitation of the requirement of the cell packaging, this also help to realize the purpose of providing the in-cell touch array substrate with narrow-border. As a result, a wider visual experience can be achieved.

12 Claims, 3 Drawing Sheets

(56) References Cited

U.S. PATENT DOCUMENTS

| | | | | |
|---|---|---|---|---|
| 2011/0032241 A1* | 2/2011 | Jeong | G09G 3/3614 | 345/212 |
| 2011/0128261 A1* | 6/2011 | Hung et al. | | 345/205 |
| 2011/0254827 A1* | 10/2011 | Tamura | G09G 3/3648 | 345/212 |
| 2013/0141660 A1* | 6/2013 | Wang | G02F 1/136286 | 349/43 |
| 2014/0152938 A1* | 6/2014 | Lee | G09G 3/3648 | 349/46 |
| 2014/0168553 A1* | 6/2014 | Park | G02F 1/134363 | 349/43 |
| 2014/0225819 A1* | 8/2014 | Onuma | G09G 3/3648 | 345/88 |
| 2014/0375534 A1* | 12/2014 | Lee | G09G 3/3648 | 345/87 |

* cited by examiner

IN-CELL TOUCH ARRAY SUBSTRATE

CROSS REFERENCE

This application is claiming a priority arisen from a patent application, entitled with "In-Cell Touch Array Substrate", submitted to China Patent Office on Dec. 26, 2013, designated with an Application Number 201310730277.5. The whole and complete disclosure of such patent application is hereby incorporated by reference.

FIELD OF THE INVENTION

The present invention relates to the technical field of display, and more particularly, to an in-cell touch array substrate.

DESCRIPTION OF PRIOR ART

In recent year, the liquid crystal display, LCD has a great leap in its development and technologies on both resolutions as well as dimensions. LCD features compact, low energy consumption, and no radiation, as a result, it has become a main stream of the flat display.

Touch screen is an important carrier for integration of input and output. Recently, with a series of compact, light-weighted palm held devices available to the market, there is a great demand from the market for the touch screen display panel.

The touch-screen technology is aimed to achieve the goals of low cost, high yield, larger dimension, and high reliability. In order to achieve these goals, on-cell and in-cell built-in touching technologies have been developed. In-cell technology features high integrating capability, thin, and light-weighted, but it has a poor yield. FIG. 4 is a circuitry of a prior art in-cell touch array substrate, and the circuitry includes a plurality of gate scanning lines 91, data lines 92, arranged alternatively, and scanning driver 93 interconnected with gate scanning lines 91, and data driver 94 interconnected with the data lines 92. However, both the data driver 94 and the scanning driver 93 are installed on top and side of the in-cell touch array substrate, it can not realize the goal of frameless on ends of the liquid crystal display.

SUMMARY OF THE INVENTION

In order to resolve the technical problem encountered by the prior art, the present invention provides an in-cell touch array substrate which can realize the purpose of providing the in-cell touch array substrate with narrow-border. As a result, a wider visual experience can be achieved.

In order to resolve the technical issues encountered by the prior art, the present invention provides an in-cell touch array substrate is provided and, which includes alternatively arranged data lines and horizontal gate scanning lines; pixel switches electrically interconnected to the adjacent horizontal gate scanning lines and data lines; pixel electrodes electrically interconnected to the pixel switches; vertical gate scanning lines arranged alternatively between every two adjacent data lines, and being perpendicular to the horizontal gate scanning lines, wherein at lease one via is defined in an intersection between the vertical gate scanning line and the horizontal gate scanning line such that the vertical gate scanning line and the horizontal gate scanning lines are electrically interconnected with each other through the via; and wherein the horizontal gate scanning lines includes first and second gate scanning lines in parallel to each other, wherein a distance between two adjacent horizontal gate scanning lines is larger than a distance between the first and second gate scanning lines.

Wherein the pixel switches and the pixel switches electrically interconnected to the first scanning lines, and the pixel switches and the pixel switches electrically interconnected to the second scanning lines are arranged on both sides of the data lines, respectively.

Wherein a first insulative layer is deployed around the horizontal gate scanning lines and the via is defined in the first insulative layer.

Wherein a second insulative layer is deployed around the vertical gate scanning line.

Wherein the vertical gate scanning lines and the data lines are alternatively arranged in parallel with each other such that the gate scanning lines and the data lines have the same driving direction.

In order to resolve the technical issues encountered by the prior art, the present invention provides another technical solution, in which an in-cell touch array substrate is provide and which includes alternatively arranged data lines and horizontal gate scanning lines; pixel switches electrically interconnected to the adjacent horizontal gate scanning lines and data lines; pixel electrodes electrically interconnected to the pixel switches; and vertical gate scanning lines arranged alternatively between every two adjacent data lines, and being perpendicular to the horizontal gate scanning lines, wherein at lease one via is defined in an intersection between the vertical gate scanning line and the horizontal gate scanning line such that the vertical gate scanning line and the horizontal gate scanning lines are electrically interconnected with each other through the via.

Wherein the vertical gate scanning lines and the data lines are alternatively arranged in parallel with each other such that the gate scanning lines and the data lines have the same driving direction.

Wherein the horizontal gate scanning lines includes first and second gate scanning lines in parallel to each other, wherein a distance between two adjacent horizontal gate scanning lines is larger than a distance between the first and second gate scanning lines.

Wherein the pixel switches and the pixel switches electrically interconnected to the first scanning lines, and the pixel switches and the pixel switches electrically interconnected to the second scanning lines are arranged on both sides of the data lines, respectively.

Wherein a first insulative layer is deployed around the horizontal gate scanning lines and the via is defined in the first insulative layer.

Wherein a second insulative layer is deployed around the vertical gate scanning line.

Wherein further includes data driver interconnected to the data lines, and scanning driver interconnected to the gate scanning lines, wherein the data driver and the scanning driver are packed within opposites of the in-cell touch array substrate.

Wherein the via is created by gate insulation (GI) mask technology.

Wherein the pixel switches are thin film field effect transistor.

In order to resolve the technical issues encountered by the prior art, the present invention provides another technical solution, in which an in-cell touch array substrate is provided and which includes alternatively arranged data lines and horizontal gate scanning lines; pixel switches electrically interconnected to the adjacent horizontal gate scanning lines and data lines; pixel electrodes electrically interconnected to the pixel switches; and data driver interconnected to the data lines, and scanning driver interconnected to the gate scanning lines, wherein the data driver and the scanning driver are packed within opposites of the in-cell touch array substrate.

By implementation of the in-cell touch array substrate made in accordance with the present invention, it can be concluded with the following advantages: within every two adjacent data lines, the vertical gate scanning lines are arranged, and which is perpendicular to the horizontal gate scanning line. At least one via is defined at the intersections of the vertical gate scanning lines and the horizontal gate scanning lines so as to create an electrical interconnection between the vertical gate scanning line and the horizontal gate scanning line. By this arrangement, both the gate scanning lines and the data lines have the same driving direction. Under the limitation of the requirement of the cell packaging, this also help to realize the purpose of providing the in-cell touch array substrate with narrow-border. As a result, a wider visual experience can be achieved.

DETAILED DESCRIPTION OF PREFERRED EMBODIMENT

Description of the embodiments will be given along with the accompanied drawings so as to illustrate the present invention can be implemented to particular embodiments. The terms of upper, lower, front, rear, left, right, internal, external, and side are merely referred and based on the orientation of the drawings. Accordingly, the use of those terms is merely for illustration, instead of limitations.

Figure 1:
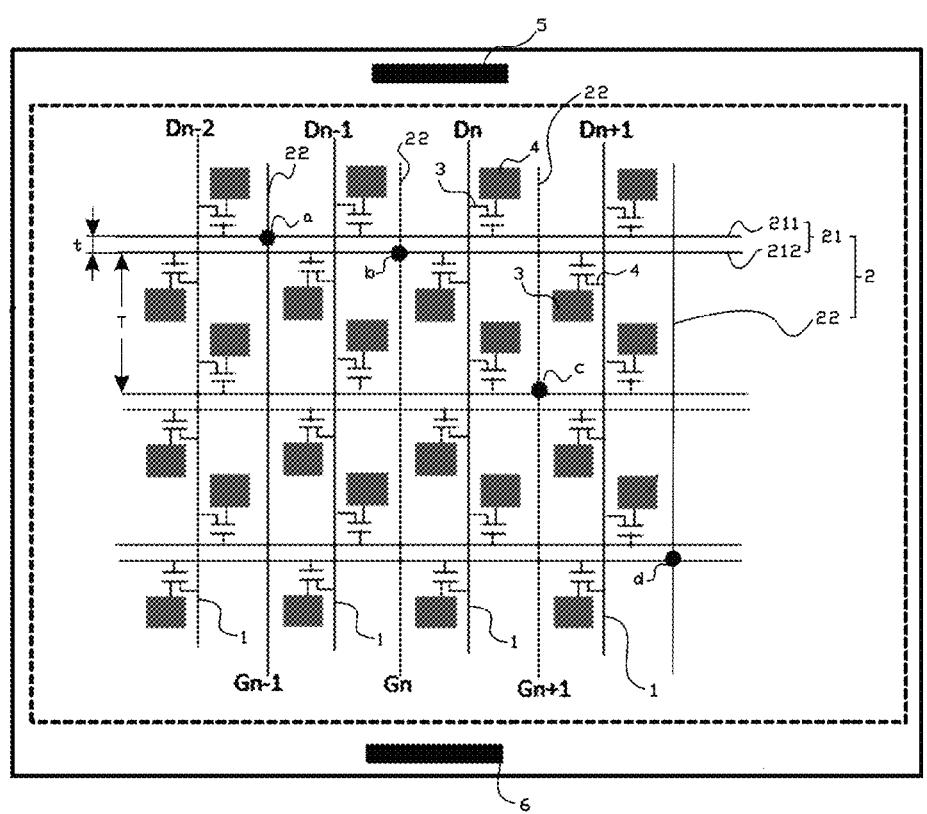
FIG. 1 is a structural and illustrational view of an in-cell touch array substrate in accordance with an embodiment of the present invention.

Referring to FIG. 1, an in-cell touch array substrate made in accordance with a first embodiment includes data lines 1 and gate scanning lines 2 of which a portion is arranged in a crisscross form with the data lines;

pixel switches 3 electrically interconnected to the adjacent horizontal gate scanning lines 2 and data lines 1;

pixel electrodes 4 electrically interconnected to the pixel switches 3; and data driver 5 interconnected to the data lines 1, and scanning driver 6 interconnected to the gate scanning lines 2, wherein the data driver 5 and the scanning driver 6 are packed within opposite side portions of the in-cell touch array substrate.

In the current embodiment, the gate scanning line 2 and the data lines 1 have the same driving direction such that the data driver 5 and the scanning driver 6 can be packed on opposite sides, upper and lower, of the in-cell touch array substrate, as shown in FIG. 1. By this arrangement provided by the present invention, realization of narrow-border or border-less frame on the left and right side of the frame can be attained. As a result, the viewer can experience a more wide-angle view.

Substantially, according to the preferred embodiment, the gate scanning lines 2 include horizontal gate scanning lines 21 and vertical gate scanning lines 22, each vertical gate scanning line being arranged between two adjacent data lines 1 and crossing the horizontal gate scanning lines 21. The horizontal gate scanning lines 21 includes-include a first scanning line 211 and a second scanning line 212 arranged in parallel with each other. A distance T between two adjacent horizontal gate scanning lines 21 is larger than a distance t between the first and second gate scanning lines 211, 212. That is to say that the distance t between the first and second gate scanning lines 211, 212 is smaller, while distance T between every two adjacent horizontal gate scanning lines is larger so as to provide more routing space for layout.

Figure 2:
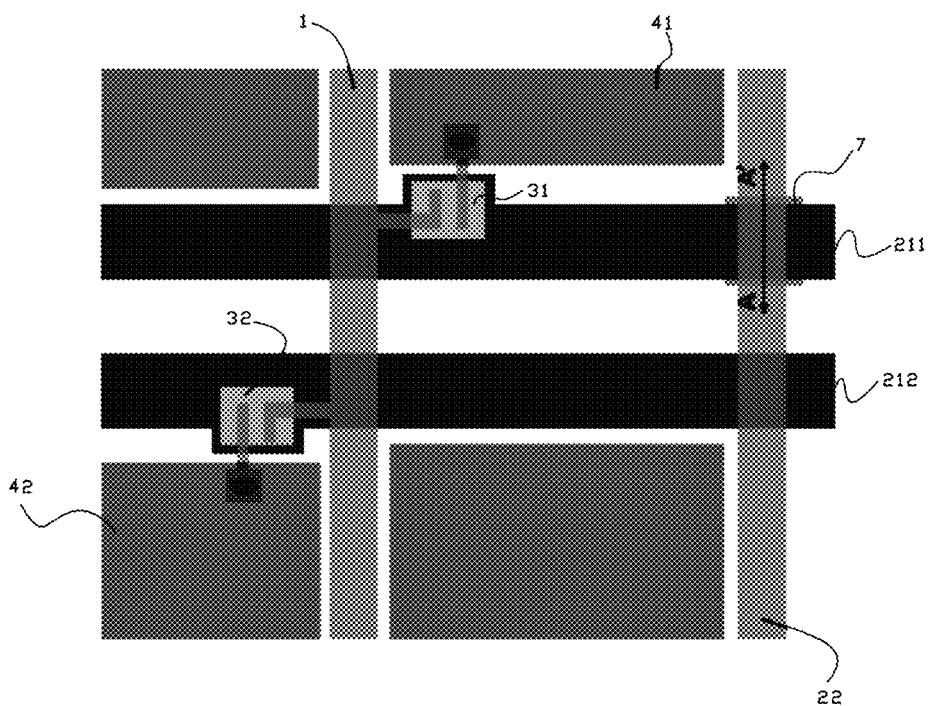
FIG. 2 is a partial and illustrational view of the in-cell touch array substrate in accordance with an embodiment of the present invention.

In the current embodiment, the vertical gate scanning lines 22 and the data lines 1 are alternately arranged and in parallel with each other, as shown in FIG. 2, in which data lines 1 are located in odd rows, while the vertical gate scanning lines 22 are arranged in even rows.

Referring to FIG. 2, which is a partial structural and illustration view of FIG. 1, and it is used to describe interconnecting relationship between the pixel unit, including the pixel switch 3 and the pixel electrode 4, and the horizontal gate scanning lines 21 and the data lines 1. The first gate scanning line 211, and the second gate scanning line 212 and the data line 1 are intersected with each other so as to create a grid configuration. The first gate scanning line 211 is arranged above the second gate scanning line 212. The first pixel switch 31 is electrically interconnected to the first gate scanning line 211 and the data line 1 and the first pixel electrode 41 and the second pixel switch 31 are electrically interconnected with each other. The second pixel switch 32 is electrically interconnected to the second gate scanning line 212 and the data line 1 and the second pixel electrode 42 is electrically interconnected to the second pixel switch 32. That is to say that the pixel switch 31 and the pixel electrode 41 which are electrically interconnected to the first gate scanning line 211, and the pixel switch 32 and the pixel electrode 42 which are electrically interconnected to the second gate scanning line 212 are disposed on opposite sides of the data line 1, respectively.

In this embodiment, the pixel switches 31 and 32 are thin film field effect transistor (TF FET).

Furthermore, a via 7 is defined in at least one of the intersections between the vertical gate scanning lines 22 and the horizontal gate scanning line 21, such as intersections a, b, c, and d in FIG. 1. The vertical gate scanning line 22 and the horizontal gate scanning line 21 are electrically interconnected at those via 7. In the current embodiment, since the horizontal gate scanning line 21 includes the first gate scanning line 211 and the second gate scanning line 212 which are in parallel with each other, accordingly, at lease one of the vertical gate scanning lines 22 can be electrically interconnected to one of the first gate scanning line 211 and the second gate scanning line 212 through the via 7 which is created by the gate insulation (GI) technology. By this arrangement, the vertical gate scanning line 22 and the first gate scanning line 211 or the second gate scanning line 212 are electrically interconnected. That is to say that the pixel switch 31 and the pixel electrode 41, and the pixel switch 32 and the pixel electrode 42 can be interconnected to at least one of the vertical gate scanning lines 22 through the first gate scanning line 211 and the second gate scanning line 212. Furthermore, because the vertical gate scanning lines 22 and the data lines 1 are alternately arranged and in parallel to each other, as a result, both the gate scanning lines 2 and the data lines 1 have the same driving direction.

During the substantial implementation, as to the traditional five (5) mask technologies in the in-cell touch array substrate, such as gate patterning, active (a-Si) patterning, S/D patterning, passivation (PVX) patterning, and pixel ITO patterning, in the current embodiment, the via 7 can be readily created by creating one additional gate insulation (Gate Insulation) on top of those five mask technologies, and the electrical interconnection between the vertical gate scanning lines 22 and the horizontal gate scanning lines can be achieved, thereby attaining the purpose of unifying the driving direction of the gate scanning lines 2 and the data line 1.

Furthermore, according to the present embodiment of the in-cell touch array substrate, it further includes a data driver 5 interconnected with the data line 1, and the scanning driver 6 interconnected with the vertical gate scanning line 22. Because the gate scanning line 2 and the data line 1 have the same direction, this properly resolves an issue that routing of the ends of the gate driving lines. As a result, the data driver 5 and the scanning driver 6 can be properly packaged on upper and lower sides of the in-cell touch array substrate shown in FIG. 1. With this, the purpose of creating an in-cell touch array substrate of narrow-border is achieved.

Figure 3:
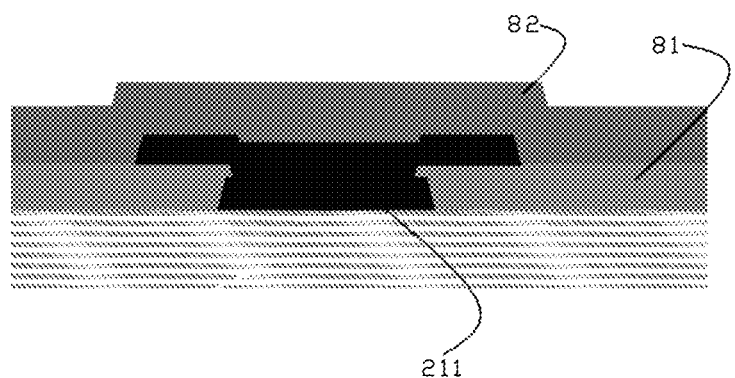
FIG. 3 is a cross sectional view of the in-cell touch array substrate taken along line A-A of FIG. 2.
Figure 4:
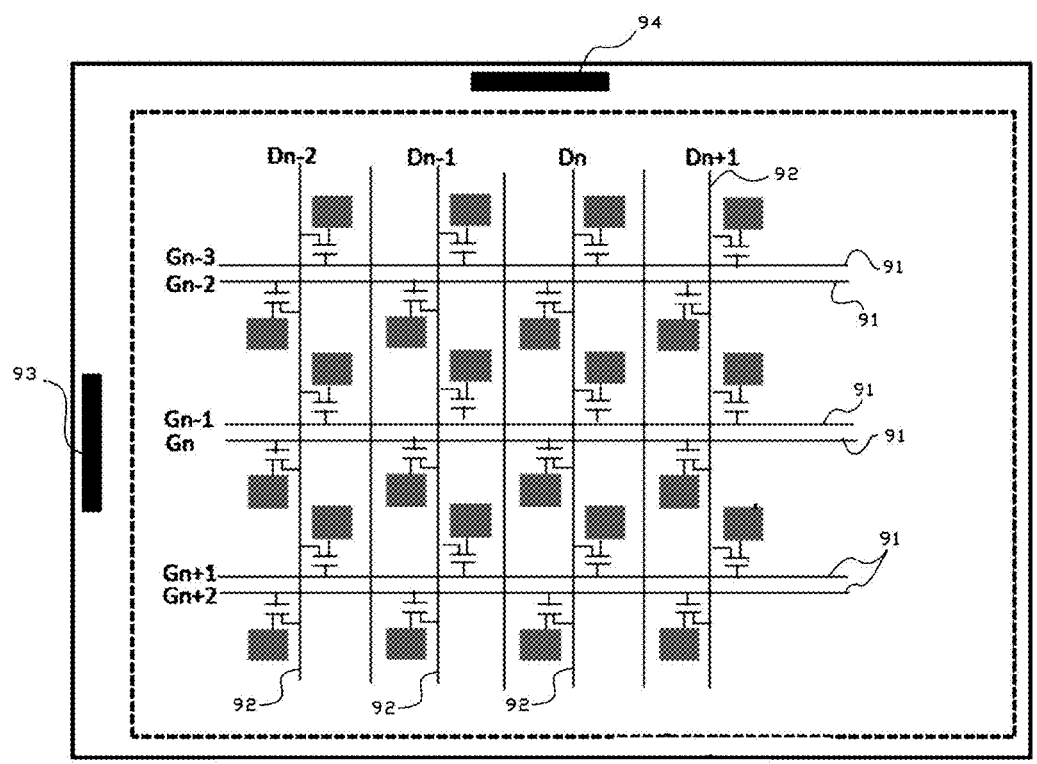
FIG. 4 is an illustrational view a prior art in-cell touch array substrate.

Referring to FIG. 3, a first insulative layer 81 is deployed around the horizontal gate scanning line 21 and the via 7 is defined in the first insulative layer 81 so as to electrically interconnect the vertical gate scanning line 22 with one of the first gate scanning line 211 and the second gate scanning line 212. A second insulative layer 82 is deployed around the vertical gate scanning line 22. Wherein both the first and second insulative layers 81, 82 can be used as a protective layer and is made from silicon nitride.

By implementation of the in-cell touch array substrate made in accordance with the present invention, it can be concluded with the following advantages: every two adjacent data lines, a vertical gate scanning line is arranged and crosses the horizontal gate scanning lines. One via is defined in at least one of the intersections of the vertical gate scanning lines and the horizontal gate scanning lines so as to create electrical interconnection between the vertical gate scanning line and the horizontal gate scanning line. By this arrangement, both the gate scanning lines and the data lines have the same driving direction. Under the limitation of the requirement of the cell packaging, this also helps to realize the purpose of providing the in-cell touch array substrate with narrow-border. As a result, a wider visual experience can be achieved.

The invention claimed is:

1. An in-cell touch array substrate, comprising:
   data lines and pairs of horizontal gate scanning lines that are arranged in a crisscross form, each pair of horizontal gate scanning lines comprising a first gate scanning line and a second gate scanning line arranged adjacent to and spaced from each other by a first distance that is smaller than a second distance between two adjacent pairs of the horizontal gate scanning lines;
   pixel switches electrically connected to the adjacent horizontal gate scanning lines and data lines;
   pixel electrodes electrically and respectively connected to the pixel switches; and
   vertical gate scanning lines arranged alternate with the data lines so that each of the vertical gate scanning line is located between every two adjacent data lines and selectively intersect the horizontal gate scanning lines, wherein at least one via is defined in the intersection between the vertical gate scanning line and the horizontal gate scanning lines such that the vertical gate scanning line and the horizontal gate scanning lines are electrically interconnected with each other through the via;
   wherein one of the pixel switches that is electrically connected to the first gate scanning line of each pair of horizontal gate scanning lines and one of the pixel switches that is electrically connected to the second gate scanning line of the pair are respectively arranged at opposite sides of one of the data lines that is common to the two pixel switches to each connect the pixel electrode connected thereto to the data line; and
   wherein the in-cell touch array substrate has opposite side portions and a data driver is arranged at one of two opposite side portions and is connected to the data lines and a scanning driver is arranged at one of the two opposite side portions to be opposite to the data driver and is connected to the vertical gate scanning lines, each of which is connected to one of the horizontal gate scanning lines.

2. The in-cell touch array substrate as recited in claim 1, wherein a first insulative layer is deployed around the horizontal gate scanning lines and the via is defined in the first insulative layer.

3. The in-cell touch array substrate as recited in claim 2, wherein a second insulative layer is deployed around the vertical gate scanning line.

4. The in-cell touch array substrate as recited in claim 1, wherein the vertical gate scanning lines that are arranged alternate with the data lines are arranged in parallel with the data lines such that the vertical gate scanning lines and the data lines have the same driving direction.

5. An in-cell touch array substrate, comprising:
   data lines and horizontal gate scanning lines that are arranged in a crisscross form;
   pixel switches electrically connected to the adjacent horizontal gate scanning lines and data lines;
   pixel electrodes electrically and respectively connected to the pixel switches; and
   vertical gate scanning lines arranged alternate with the data lines so that each of the vertical gate scanning line is located between every two adjacent data lines and selectively intersect the horizontal gate scanning lines, wherein at least one via is defined in the intersection between the vertical gate scanning line and the horizontal gate scanning lines such that the vertical gate scanning line and the horizontal gate scanning lines are electrically interconnected with each other through the via;
   wherein the pixel switch and the pixel electrode that are electrically connected to a first one of the horizontal gate scanning lines and the pixel switch and the pixel electrode that are electrically connected to a second one of the horizontal gate scanning line that is adjacent to the first one of the horizontal gate scanning lines are respectively arranged at opposite sides of one of the data lines that is common to the pixel switches respectively connected to the first one and the second one of the horizontal gate scanning lines; and
   wherein the in-cell touch array substrate has opposite side portions and a data driver is arranged at one of two opposite side portions and is connected to the data lines and a scanning driver is arranged at one of the two opposite side portions to be opposite to the data driver and is connected to the vertical gate scanning lines, each of which is connected to one of the horizontal gate scanning lines.

6. The in-cell touch array substrate as recited in claim 5, wherein the vertical gate scanning lines that are arranged alternate with the data lines are arranged in parallel with the data lines such that the vertical gate scanning lines and the data lines have the same driving direction.

7. The in-cell touch array substrate as recited in claim 6, wherein the horizontal gate scanning lines are grouped into pairs and each pair includes first and second gate scanning lines adjacent to and in parallel to each other, wherein a distance between two adjacent ones of the pairs of horizontal gate scanning lines is larger than a distance between the first and second gate scanning lines of each pair.

8. The in-cell touch array substrate as recited in claim 5, wherein a first insulative layer is deployed around the horizontal gate scanning lines and the via is defined in the first insulative layer.

9. The in-cell touch array substrate as recited in claim 8, wherein a second insulative layer is deployed around the vertical gate scanning line.

10. The in-cell touch array substrate as recited in claim 5, wherein the via is created by gate insulation (GI) mask technology.

11. The in-cell touch array substrate as recited in claim 5, wherein the pixel switches are each a thin film field effect transistor.

12. An in-cell touch array substrate, comprising:
- data lines and pairs of horizontal gate scanning lines that are arranged in a crisscross form, each pair of horizontal gate scanning lines comprising a first gate scanning line and a second gate scanning line arranged adjacent to and spaced from each other by a first distance that is smaller than a second distance between two adjacent pairs of the horizontal gate scanning lines;
- pixel switches electrically connected to the adjacent horizontal gate scanning lines and data lines;
- pixel electrodes electrically and respectively connected to the pixel switches;
- vertical gate scanning lines arranged alternate with the data lines so that each of the vertical gate scanning line is located between every two adjacent data lines and selectively intersect the horizontal gate scanning lines, wherein at least one via is defined in the intersection between the vertical gate scanning line and the horizontal gate scanning lines such that the vertical gate scanning line and the horizontal gate scanning lines are electrically interconnected with each other through the via; and
- a data driver connected to the data lines and a scanning driver connected to the vertical gate scanning lines, wherein the data driver and the scanning driver are arranged on opposite side portions of the in-cell touch array substrate and each of vertical gate scanning lines is connected to one of the horizontal gate scanning lines;
- wherein the pixel switch and the pixel electrode that are electrically connected to the first gate scanning line of each pair of horizontal gate scanning lines and the pixel switch and the pixel electrode that are electrically connected to the second gate scanning line of the pair are respectively arranged at opposite sides of one of the data lines that is common to the pixel switches respectively connected to the first and second gate scanning lines of the pair.

* * * * *